us# United States Patent [19]

Wieck

[11] 4,149,676
[45] Apr. 17, 1979

[54] EXTRACTORS

[76] Inventor: Gregory J. Wieck, Enterprise, Oreg. 97828

[21] Appl. No.: 790,555

[22] Filed: Apr. 25, 1977

[51] Int. Cl.² .............................................. B05B 3/18
[52] U.S. Cl. .................................. 239/184; 239/189; 239/210
[58] Field of Search ....................... 137/344; 251/149; 239/99, 178, 183–190, 200, 210, 212, 213, 273, 286

[56] References Cited

U.S. PATENT DOCUMENTS

| | | | |
|---|---|---|---|
| 1,079,817 | 11/1913 | Williamson | 239/183 X |
| 3,349,794 | 10/1967 | Behlen | 239/183 X |
| 3,679,135 | 7/1972 | Grosch | 239/183 X |
| 3,729,016 | 4/1973 | Linsowe | 239/212 X |

Primary Examiner—John J. Love
Attorney, Agent, or Firm—Klarquist, Sparkman, et al

[57] ABSTRACT

An elongated extraction tube resting on sealing saddles on valved risers of a buried mainline is pulled along the mainline by a hydraulically driven capstan on the extraction tube pulling an anchored cable resting on saddles and guiding the tube into each saddle. The extraction tube spans two risers, and has a series of check valves receiving water from the saddles, and opens the valve of each riser as the tube comes into sealed engagement with the saddle of that riser and closes that valve just before the tube is moved out of that saddle. In an alternate embodiment, an extraction tube is moved along floating saddles by powered rollers engaging flanges on risers supporting the saddles, and levers on the risers are pivoted by the tube to actuate capstans to open spring closed valves in the risers.

15 Claims, 11 Drawing Figures

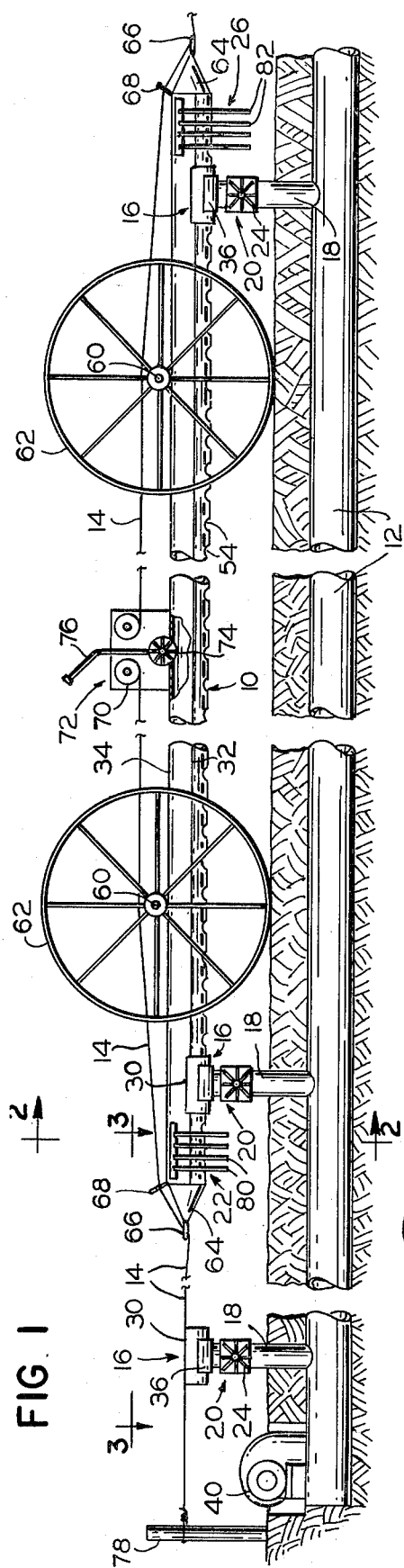
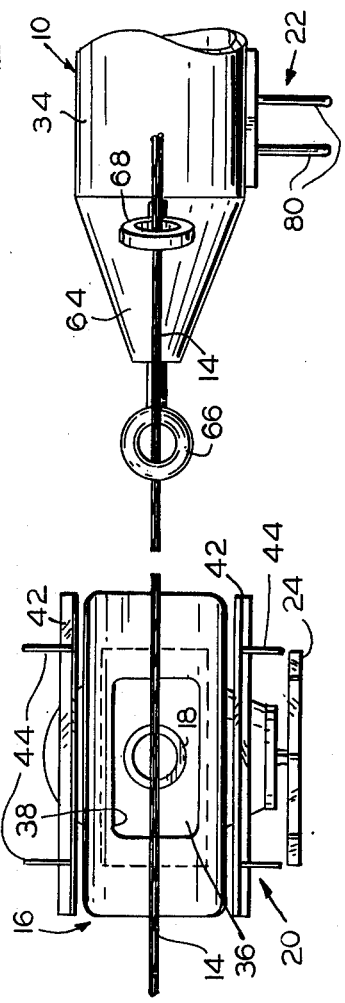
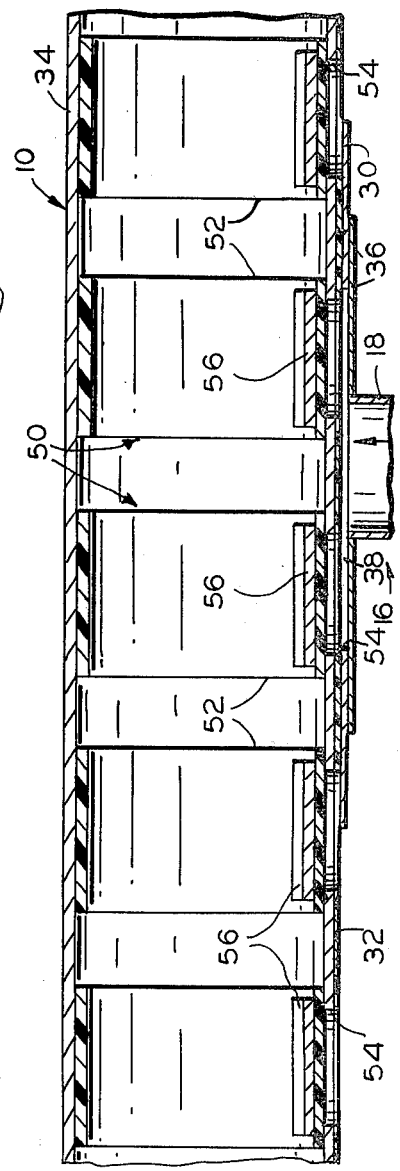

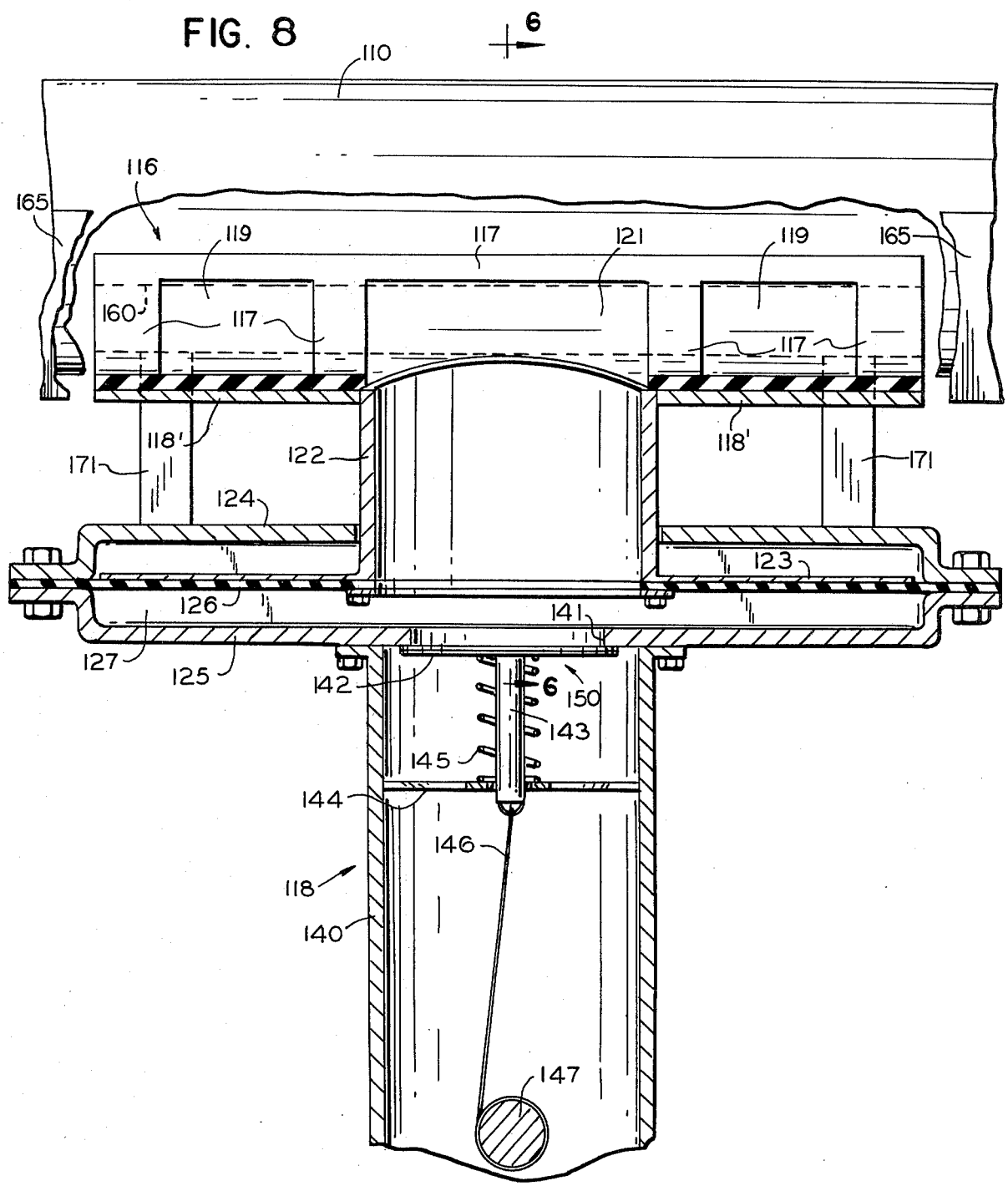

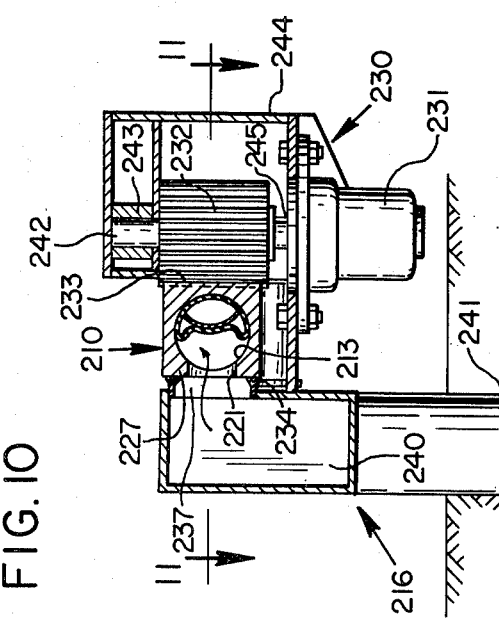
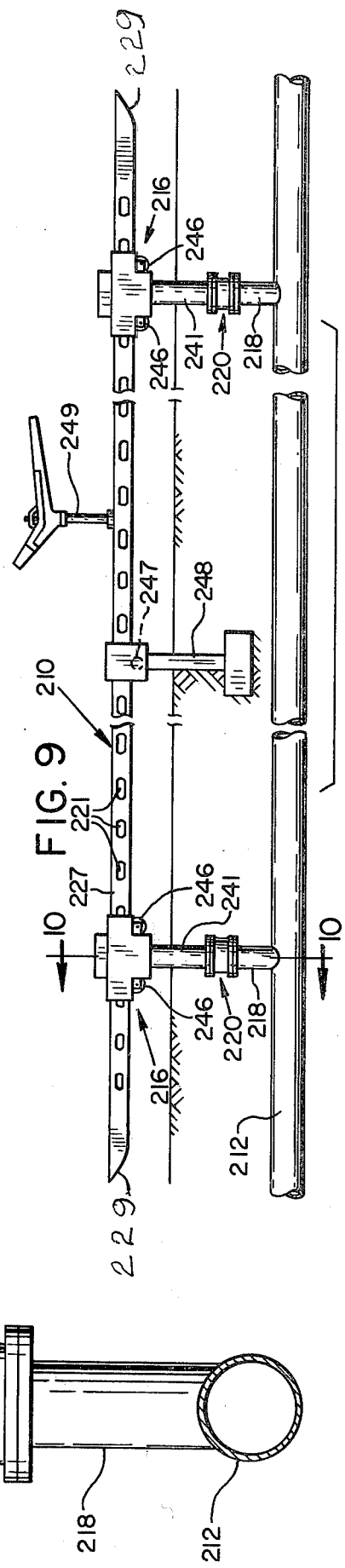

EXTRACTORS

DESCRIPTION

This invention relates to improved irrigation extraction systems, and more particularly to improved extractors.

An object of the invention is to provide improved irrigation extraction systems.

Another object of the invention is to provide improved extractors.

A further object of the invention is to provide an extractor system in which an elongated extraction tube is moved along a mainline and always sealingly engages one of a series of injector units on risers spaced along the mainline.

Another object of the invention is to provide an extraction system in which a tow cable lying in injector saddles spaced along a mainline pulls an extraction tube into engagement with the saddles seriatim. Another object of the invention is to provide an extraction system including a fixed injector and an extraction tube moved while in sealed engagement with the injector and including actuator means for opening and closing a valve supplying water to the injector.

Another object of the invention is to provide an extraction system in which an underside of a valved extraction tube is coated with a resilient sealing material which seals to and slides along an injector saddle on which the extraction tube is positioned.

Another object of the invention is to provide an extraction system in which a capstan carried by an extraction tube pulls the extraction tube along an anchored tow cable which lies in series of injector saddles and guides the extraction tube into the saddles.

Another object of the invention is to provide an irrigation extraction system in which an extraction tube is moved along a series of floating saddles pressed by water pressure into sealing engagement with the extraction tube.

Another object of the invention is to provide an irrigation extraction system in which an extraction tube carries a plurality of driven rollers engaging the undersides of tracks of a series of risers having saddles engaging the underside of the tube and supplying water thereto.

Another object of the invention is to provide an irrigation extraction system in which a riser valve includes a spring closed valve member opened by a capstan driven by a cable connected to a lever moved by irrigation equipment being moved past the riser.

Another object of the invention is to provide a saddle including a housing and a sealing strip of polyurethane bonded to the housing.

In the drawings:

FIG. 1 is a fragmentary side elevation view of an irrigation extraction system forming one embodiment of the invention;

FIG. 3 is a top plan view taken along line 3—3 of FIG. 1;

FIG. 4 is an enlarged, vertical, sectional view taken along line 4—4 of FIG. 2;

FIG. 8 is an enlarged, fragmentary partially sectional view of the irrigation extraction system of FIG. 5;

FIG. 9 is a fragmentary, side elevation view of an irrigation extraction system forming an alternate embodiment of the invention;

FIG. 10 is an enlarged, vertical sectional view taken along line 10—10 of FIG. 9; and FIG. 11 is an enlarged, fragmentary, horizontal sectional view taken along line 11—11 of FIG. 10.

Figure 2:
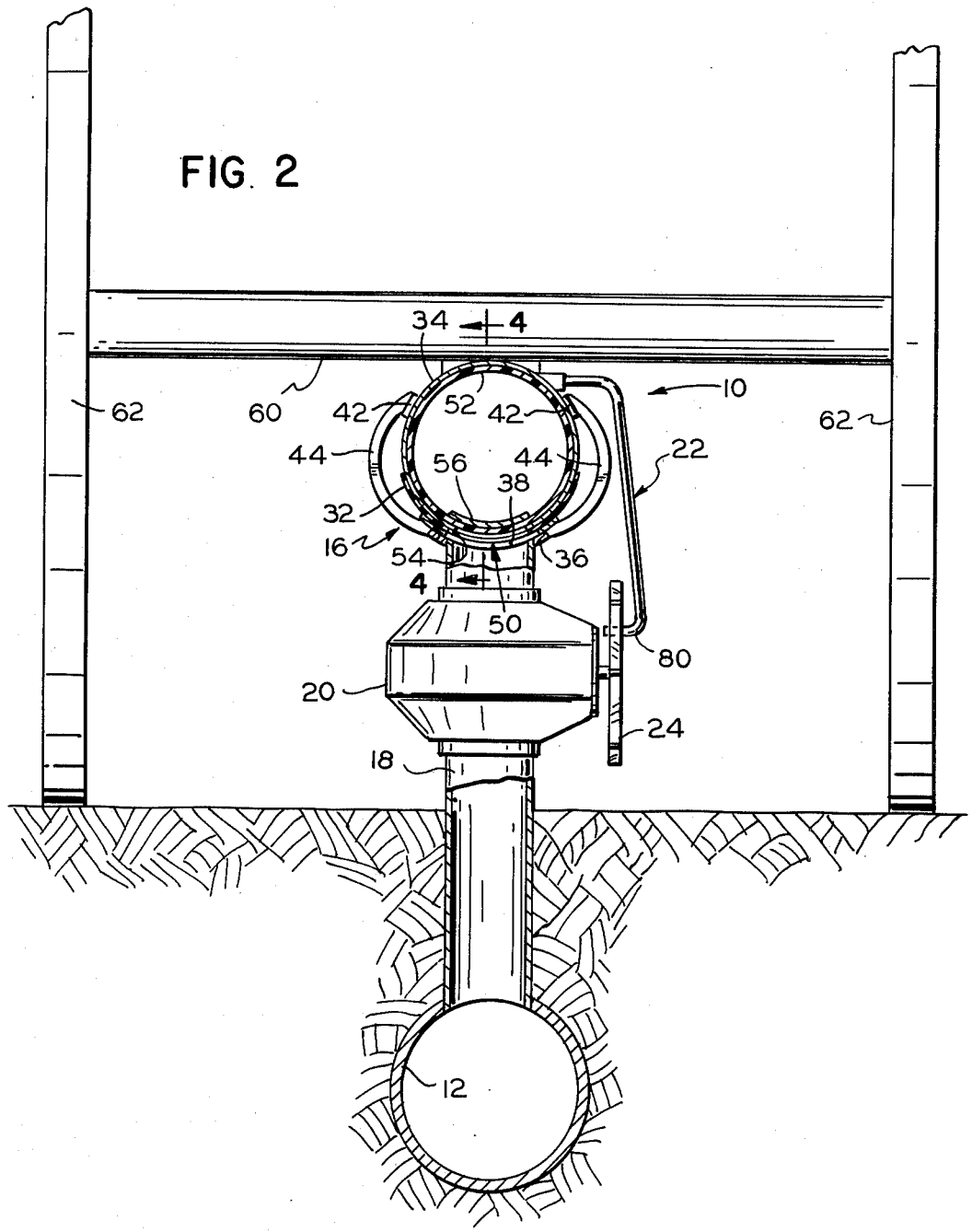
FIG. 2 is a vertical, sectional view taken along line 2—2 of FIG. 1.
Figure 5:
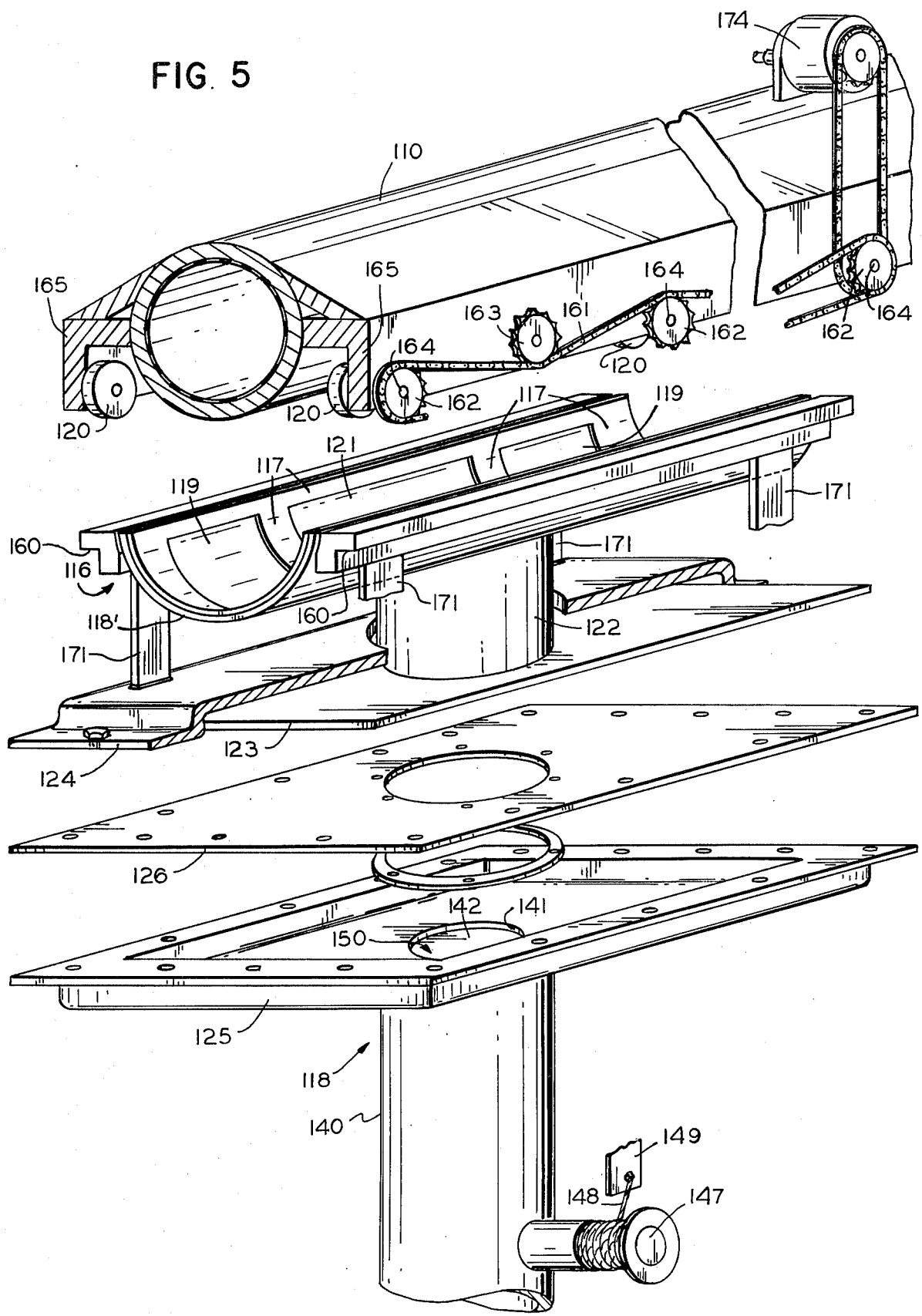
FIG. 5 is an exploded perspective view of an irrigation extraction system forming an alternate embodiment of the invention.
Figure 6:
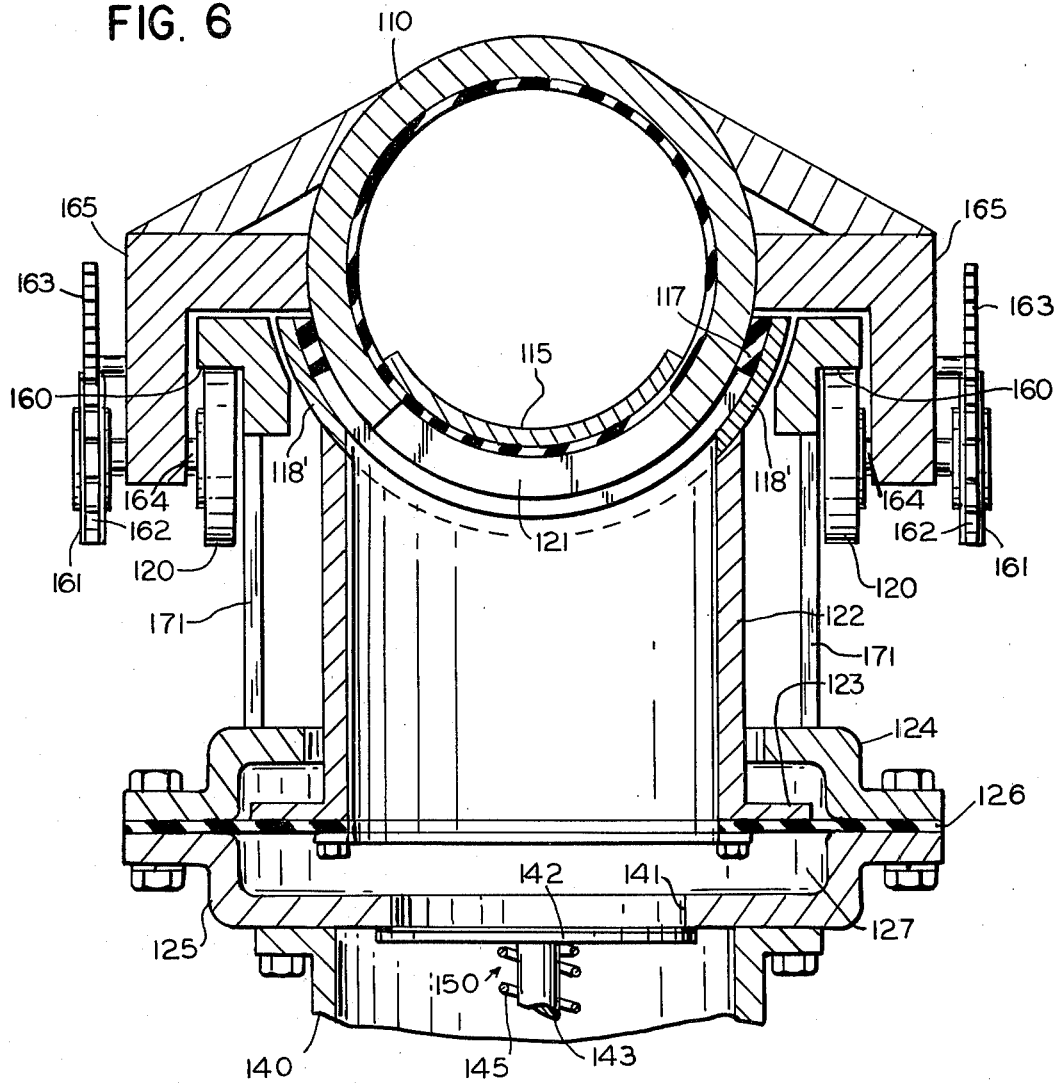
FIG. 6 is an enlarged, fragmentary, vertical transverse sectional view taken along line 6—6 of FIG. 8.
Figure 7:
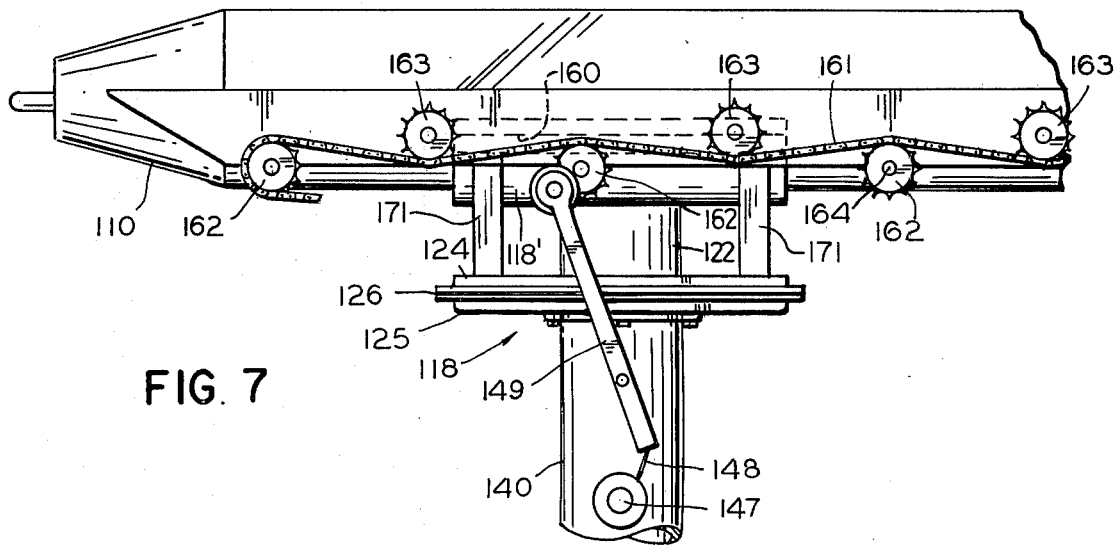
FIG. 7 is a fragmentary side elevation view of the irrigation extraction system of FIG. 5.

Referring now in detail to the drawings, there is shown therein an improved irrigation extraction system forming one embodiment of the invention and including a valve extraction tube 10, which is pulled along a buried mainline 12 by a tow cable 14 and always sealingly engages one of a series of injector saddles 16 mounted on equally spaced, valved risers 18 having gate valves 20. A rack type actuator 22 carried at one end of the extraction tube engages a spoked or pinion type wheel 24 of each valve 20 to open the valve when the extraction tube is moved to the left, as viewed in FIG. 1, and close the valve when the extraction tube is moved to the right. A second rack type actuator 26 at the other end of the extraction tube engages each wheel 24 to close the valve 20 associated therewith when the extraction tube is moved to the left and open the valve 20 when the extraction tube is moved to the right.

Each saddle 16 includes an upwardly facing, elongated, peripheral sealing member 30 forming a portion of a cylinder of the same diameter as the cylindrical exterior of a thick covering 32 of a resilient sealing material such as, for example, polyurethane, adhered to the bottom portion of a section of pipe 34 of the extraction tube 10. Each saddle also includes an outer chamber-forming member 36 forming a portion of a cylinder of larger diameter than that of the member 30 which is welded to the member 36. The coating 32 sealingly and slidably engages the member 30 and forms an injection chamber 38 with the member 36, the injection chamber being supplied with water under pressure from the mainline 12, which is supplied by a pump 40 connected to the mainline. Rollers 42 (FIG. 2) carried by resilient arms 44 on the saddle press the tube 10 (and the covering 32) downwardly to effectively seal the covering to the saddle. The extraction tube 10 is sufficiently long to span greater than the distance between any adjacent two of the saddles 16 so that the tube is always in sealed engagement with at least one of the saddles.

The extraction tube 10 has a series of check valves 50 closely spaced along the bottom of the tube 10 with check valves open to admit water from the chamber 28 into the pipe 34. The check valves are generally of the type disclosed and claimed in my U.S. Pat. Nos. 3,447,751 and 3,608,676, and include flexible bands 52 normally covering inlet ports or holes 54 in the bottom of the pipe 34 and the covering 32. Stiffening discs 56 back up the portions of the bands covering the ports, and the upper portions of the bands are fixed to the inner wall of the pipe 34. The spacing of the check valves along the tube is such relative to the length of the chamber 38 that at least one of ports 54 is always fully open to the chamber 38.

The pipe 34, as shown, is welded to two axles 60 (FIGS. 1 and 2) near the ends of the pipe, and the axles are supported by pairs of ground engaging wheels 62. If desired, the pipe could be suspended by spring suspensions from the axles. Thus, the main weight of the pipe is supported by the wheels and axles which straddle the mainline 12 and saddles 16. Tapered plugs 64 close the ends of the pipe 34 and carry grooved pulleys 66 and 68, which engage the cable 14 and guide it to and from a capstan 70 of a car puller type of winch 72 mounted on the upper portion of the pipe 34 and driven by a water turbine drive 74 supplied with water under pressure from the pipe 34 and exhausting to a large sprinkler 76 or to any travelling applicator which irrigates the field along which the tube 10 is pulled. The ends of the cable are secured to anchor posts 78. Since the tow cable 14 normally lies in the saddles 16, the cable guides the tube 10 into the saddles.

The drive 74 is reversible to drive the extraction tube 10 first to one end of the field and then to the other. When the extraction tube is moved to the left, as viewed in FIG. 1, a group of rigid arms 80, which are fixed to the upper portion of the left hand end portion of the pipe 34 and forming the rack type actuator 22, engage the upper portion of the pinion 24 to turn the pinion 24 to open the valve 20 just after the left hand end of the extraction tube has sealingly engaged the saddle 16. When hook-like rigid arms 82 of the actuator are moved to the left and into engagement with one of the pinions 24, which is just before the tube moves out of sealed engagement with the saddle 16, the arms 82 turn the pinion to close the gate valve 20. Conversely, when the extraction tube is moved to the right, the actuator 26 opens each valve 20 just after the extraction tube 10 has come into sealed engagement with the saddle, and the actuator 22 closes each valve 20 just before the extraction tube is moved out of sealed engagement with the saddle.

Instead of, or in addition to, the sprinkler 76, a line move carrying sprinklers and movable with the extraction tube 10 may be supplied with water by the tube 10.

Embodiment of FIGS. 5-8

An irrigation extraction system forming an alternate embodiment of the invention includes an extraction tube or pipe 110 which has a series of check valves 115 spaced along the bottom thereof and which are like the check valves 50. The pipe always spans a plurality of risers 118 connected to a buried mainline (not shown) and arranged in a row, and drives itself along the risers by means of rollers 120 which are driven by a hydraulic motor 174 carried by the extraction tube and receiving water under pressure from the extraction tube.

The extraction tube 110 is supported by floating saddles 116 having polyurethane sealing strips 117 bonded to semi-cylindrical saddle portions 118' of sheet metal to define entrance and exit sealing or buffer chambers 119 and central extraction chambers 121. Each saddle portion is supported by a short, central, tubular portion 122 integral with a flat base 123. The base 123 is movable up and down and somewhat universally in chamber 127 formed by flanged cup members 124 and 125. A generally annular diaphragm 126 is sealed at its outer periphery between flanges of the members 124 and 125 and is sealed at its inner periphery to the bottom of the base 123. The diaphragm and the base 123 form a piston, and pressure of the water in the chamber 127 presses the base upwardly to press the sealing strips against the bottom half of the extraction tube. Preferably the effective area of the piston is about twice the projected area of the chambers 119 and 121, so as to cause the saddle portion to be pressed upwardly against the pipe.

Each flanged cup member 125 is sealed to and supported by the upper end of a vertical pipe 140 supplied with water from the mainline, and has an outlet valve opening 141 which is normally closed by a valve disc 142 on a stem 143 slidable in a spider 144. A compression spring 145 normally keeps the valve disc 142 in its closing position, and the valve disc is moved downwardly to open the valve opening 141 by a cable 146 connected at its upper end to the lower end of the valve stem 143 and at its lower end to a capstan 147 extending across and through the pipe 140 and mounted in aligned, sealed bearings in the pipe wall. The copstan 147 is rotated to pull the valve disc 142 to its open position by an outer capstan cable 148 and a lever 149 pivoted in either direction from its normal, vertical position by engagement of the extraction tube therewith. The action of the spring 145 normally keeps the lever 149 in its vertical position.

The drive rollers 120 hold the extraction tube 110 down against the upwardly directed pressure of the water in the chambers 119 and 121 to keep the tube 110 sealed to the saddles, in addition to the weight of the tube 110. The drive rollers engage flanges or tracks 160 secured to posts 161 mounted on the flanged cup members 125, and are driven by the hydraulic motor 174 through chains 161 and sprockets 162. Pairs of idler sprockets 163 are provided between the sprockets 162 to give sufficient engagement of the chains with the sprockets 162. Shafts 164, to which the rollers and sprockets 162 are keyed, are journaled in bearings mounted in angle members 164 rigidly secured to opposite sides of the tube 110. Both end portions of the angle members 165 are upwardly flared to guide the angle members onto the tops of the flanges 160 when the tube 110 is moved in either direction, the motor 174 and the rollers 120 being reversible for that purpose, The tube spans several of the saddles so that sufficient traction is provided.

Embodiment of FIGS. 9-11

An irrigation extraction system forming an alternate embodiment of the invention includes a rectangular extraction tube or pipe 210 which has a cylindrical bore 213 closed at its ends, outlet holes 221 positioned in one vertical side 227 only of the pipe and sloping ends 229. Check valves 215, like the check valves 115 are positioned in the pipe. The tube 210 is moved along a buried mainline 212 and always sealingly engages one of a series of side injector saddles 216 mounted on equally spaced, valved riser assemblies 218 having solenoid controlled gate valves 220. Each saddle supports a drive assembly 230, including an electric motor 231 driving a pinion 232, which meshes with a rack 233 formed along the entire side of the tube 210 opposite to the side 227. Endless sealing strips 234, 235 and 236 define an extraction area 237 and buffer areas 238 and 239 and seal against the planar side 227. Each saddle 216 has a chamber 240 supplied with water under pressure by a pipe 241 when the valve 220 is opened by actuation of a limit switch (not shown) actuated by the tube when the tube is at the saddle.

The gear 232 is on a shaft 242 havings its outboard end journaled in bearing 243 carried by bracket 244 and its inboard end journaled in bearing portion 245 of the motor 231 which is carried by the bracket. The bracket is supported by the riser assembly 216. The gears 232 hold the tube 210 tightly against the sealing strips 234, 235 and 236 of each adjacent pair of saddles 216. The tube 210 is supported by rollers 246 carried by the saddles 216 and by rollers 247 carried by intermediate supports 248. The pipe 210 can carry and supply sprinklers 249, and also can have an outlet coupling (not shown) on its top side connected by a hose (not shown) to an irrigation line move (not shown), moved with the tube but driven independently. The motors 231 each may be actuated by a limit switch (not shown) at each saddle and actuated by the tube 210.

What is claimed is:

1. In an irrigation extraction system,
   an elongated, straight, horizontal, extraction tube of a predetermined length having inlet valve means extending along one side thereof,
   sprinkler means supplied by the tube,
   a mainline of a length greater than said predetermined length,
   a plurality of valved outlets connected to the mainline and spaced apart along the mainline a distance less than said predetermined length so that the tube is always at one of the outlets when it is moved lengthwise along the mainline,
   plurality of seals surrounding the outlets for sealingly engaging an adjacent portion of the tube to surround a portion of the inlet valve means and permitting the tube to slide relative to the seals,
   means for moving the tube lengthwise along the mainline while always in engagement with at least one of the seals,
   means pressing the tube against engaged ones of the seals,
   means for opening each valved outlet when the tube engages the seal surrounding that valved outlet and closing that valved outlet when the tube moves out of sealed engagement with that seal,
   and means for opening each portion of the inlet valve means only when it is surrounded by one of the seals.

2. The irrigation extraction system of claim 1 wherein the portions of the tube engaging the seals are arcuate.

3. The irrigation extraction system of claim 1 wherein the tube is cylindrical.

4. In an irrigation extraction system,
   a mainline having a plurality of valve outlets spaced therealong,
   an extraction tube of a length sufficient to span adjacent ones of the outlets,
   sprinkler means movable with the tube,
   means for moving the tube along the mainline and in engagement with the valve outlets,
   inlet valve means extending along the entire length of the tube,
   a plurality of saddle means at the valve outlets for sealingly and slidably engaging the portions of the tube at the valve outlets,
   means for opening each valve outlet when the saddle means at the outlet sealingly engages the tube and for closing each valve outlet when the tube is moved out of sealing engagement with that valve outlet,
   and means for opening the portion of each inlet means at each saddle.

5. The irrigation extraction system of claim 4 wherein the inlet valve means are positioned at one side of the tube.

6. The irrigation extraction system of claim 5 wherein the inlet valve means are positioned only at said one side.

7. The irrigation extraction system of claim 6 wherein said side is a generally vertical side portion of the tube.

8. The irrigation extraction system of claim 7 wherein said side is planar.

9. The irrigation extraction system of claim 8 wherein the tube has a rack portion extending therealong, and a driving pinion engaging the rack portion.

10. The irrigation extraction system of claim 9 wherein the rack portion is at the side of the tube opposite to said one side.

11. The irrigation extraction system of claim 6 wherein said one side is the bottom side of the tube.

12. In an irrigation extraction system,
    a mainline,
    a plurality of valve outlets spaced apart along the mainline not greater than a predetermined distance,
    an extraction tube of a length greater than said predetermined distance and having valve inlet means positioned along the entire length of the tube,
    a plurality of saddle means surrounding the valve outlets and adapted to sealingly engage the tube around a portion of the valve inlet means,
    actuator means carried with the tube for opening each valve outlet when the saddle means surrounding that valve outlet has sealingly engaged the tube, and closing the valve outlet means when the saddle means is not in sealing engagement with the tube,
    and means for opening the portion of the valve inlet means surrounded by the saddle means and for closing the valve inlet means when it has moved out of sealing engagement with the saddle means.

13. The irrigation extraction system of claim 12 wherein the actuator means includes pinion means for turning the valve outlets, first rack means at one end of the tube for engaging one side of the pinion means and turning it to open the valve outlet and second pinion means at the other end of the tube for engaging the other side of the pinion means to close the valve outlet.

14. The irrigation extraction system of claim 13 wherein the pinion means comprises a spoked wheel and each rack means comprises a series of fingers.

15. The irrigation extraction system of claim 12 wherein the actuator means includes spring-pressed normally closed valve means, capstan means for opening the valve means, and lever means operable in either direction to drive the capstan means.

* * * * *

UNITED STATES PATENT AND TRADEMARK OFFICE
CERTIFICATE OF CORRECTION

PATENT NO. : 4,149,676
DATED : April 17, 1979
INVENTOR(S) : GREGORY J. WIECK

It is certified that error appears in the above—identified patent and that said Letters Patent are hereby corrected as shown below:

Col. 1, line 21, "Another" should be start of new paragraph;

Col. 4, line 14, change "copstan" to --capstan--;

Col. 4, line 38, change the comma after "purpose" to a period;

Col. 5, line 25, insert --a-- before "plurality";

Col. 5, line 59, change "the" (1st occurrence) to --that--

Signed and Sealed this

Twenty-fourth Day of July 1979

[SEAL]

Attest:

LUTRELLE F. PARKER

Attesting Officer    Acting Commissioner of Patents and Trademarks